W. WORTMANN.
MEANS FOR ELECTRICALLY DRIVING MOTOR AGRICULTURAL MACHINES.
APPLICATION FILED OCT. 1, 1912.
1,066,774.
Patented July 8, 1913.
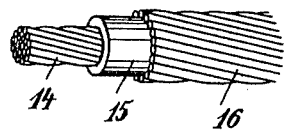
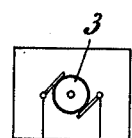
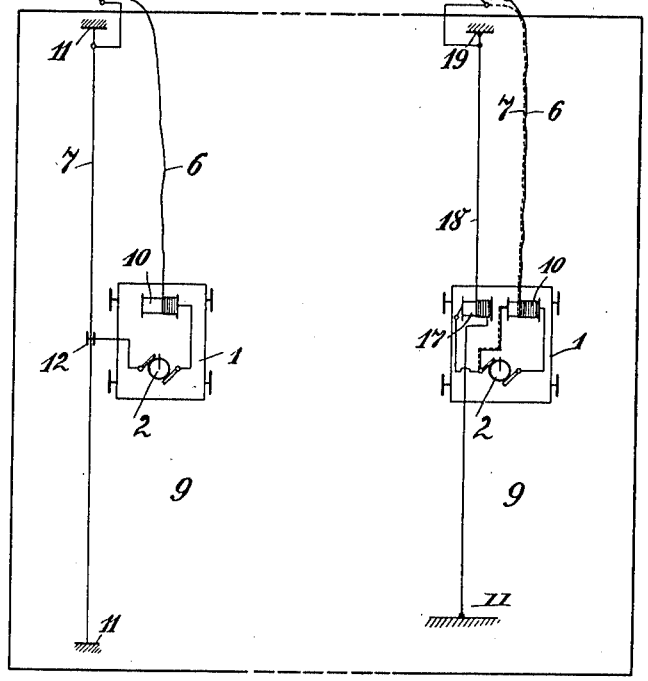

UNITED STATES PATENT OFFICE.

WILHELM WORTMANN, OF MAINZ, GERMANY.

MEANS FOR ELECTRICALLY DRIVING MOTOR AGRICULTURAL MACHINES.

1,066,774.　　　　Specification of Letters Patent.　　Patented July 8, 1913.

Application filed October 1, 1912. Serial No. 723,375.

*To all whom it may concern:*

Be it known that I, WILHELM WORTMANN, a citizen of the Empire of Germany, and residing at Mainz, Germany, have invented certain new and useful Improvements in Means for Electrically Driving Motor Agricultural Machines, of which the following is a specification.

My invention relates to means for electrically driving motor agricultural machines, current being supplied from the farmyard to the field in known manner by means of an insulated conductor and returning through a bare, grounded conductor which may be used as the trolley line.

According to my invention the current is transmitted to the field by the insulated conductor of a cable which lies untensioned on the ground and is wound up on, and unwound from the traveling machine. The return conductor is, however, a bare, grounded conductor which lies on the field and remains electrically connected through movable contacts with the machine. The current therefore always flows through only that distance which corresponds with that of the work done. The voltage losses are therefore reduced and the drive is more economical.

As compared with known, electrical, motor machines for working the ground which operate only with insulated cable and fixed electrical connections, the described arrangement has the following advantages:—The diameter and weight of the insulated cable are considerably less because, when single-phase or direct current is used, the cable has only one insulated conductor, and when polyphase current is employed only two; consequently, a greater length of cable can be wound on the machine, and the course worked by the machine can be increased.

As compared with the known arrangement in which the current is supplied by means of sliding contacts through bare conductors suspended from insulators, my new arrangement has the following advantages:—Both the insulating supports for the conductors and the insecurity and trouble occasioned by changing their positions are dispensed with. The conductors lie untensioned on the ground, whereby the machine obtains greater freedom of movement. The bare conductor is, moreover, at the same potential as the earth, whereby greater safety in working is obtained. Now as the armor of the cable must be grounded in order to increase the safety while working, according to my invention the armor is simultaneously employed as return conductor, so that the bare return conductor may be made smaller or entirely dispensed with. Further, the grounded return conductor is then connected to the grounded agricultural plant, *e. g.* rails, or a special conductor. In this arrangement, therefore, the conductor grounding the working-machine is flowed through by the working current and operation is impossible when the grounded conductor is interrupted. This arrangement is specially effective in protecting the workmen from the results of faults in the insulation of the cable or from atmospheric discharges. The currentless ground conductor hitherto generally used with electric plows is now dispensed with.

The described motor agricultural machines or implements must be of as light construction as possible, so that they shall not make the ground too hard, and when doing light work, such as pulling sowing-machines, hoeing-machines and so on, be able still to work economically. These machines then have the drawback, however, that when doing heavier work, such as pulling plows, turnip-lifters, harvest wagons and the like, insufficient friction is produced to admit of forward movement. According to my invention I overcome this difficulty by employing the described grounded, bare conductor lying on the field as an anchor-rope, along which the machine can pull itself. The anchor-rope may be fastened at both ends of the field to posts or anchor-wagons, or the rails may be so laid on the field that the anchor-rope can be directly anchored to them. In contradistinction to known motor agricultural machines of a similar type, in the arrangement according to my invention the special anchor-rope carrying no current, or the anchor-chain is dispensed with, so that the entire system is very much simplified.

Two illustrative embodiments of my invention are represented by way of example in the accompanying drawings, wherein:—

Figure 1 is a diagram showing a transmission plant wherein the agricultural machine receives its current from an insulated feeder, while a grounded bare return conductor is employed as a trolley wire; Fig. 2 is a diagram showing the connections when the core of a concentric cable is employed as feeder and its armor as the return conductor, an anchored rope also being employed which may be used as a supplementary return feeder, and Fig. 3 is a perspective view of a concentric cable with the outer portions partly cut away.

Referring to the drawing, the agricultural machine 1 carries a motor 2 receiving current from the generator 3 located in the powerhouse at the farmyard or other suitable place, the current being supplied by way of the supply main 4 and the cable 6 and returning by way of conductors 7 and 8. The conductors from the farmyard to the field 9 are conveniently the overhead wire 4 terminating in a plug-and-socket connection 5 and the rails 8. According to my invention, current is supplied to the machine 1 by means of an insulated cable 6 which lies untensioned on the ground and is wound up on and paid out by the drum 10, the return conductor being a bare conductor varying in operative length according to the travel of the machine. The one end of the insulated cable 6 is connected by a sliding contact or the like with one terminal of the motor 2. In the illustrative embodiment shown in Fig. 1 the current returns along the bare grounded conductor 7, which lies on the ground, and is fastened at two points 11, 11 so that it can be used as a trolley line, and can collect the return current from the other terminal of the motor, through the trolley 12. It is thus seen that that length of the return conductor 7 which is in circuit depends upon the distance of the machine from the starting point 5, i. e. upon the work done and that as compared with a return conductor of constant length, the economies already referred to are obtained.

In the illustrative embodiment shown in Fig. 2, a concentric cable is employed as feeder, but its outer conductor or armor is employed as the return conductor and is therefore connected at the machine end with one terminal of the motor, and at the other end with the rails. This concentric cable, whose known construction is clearly seen in Fig. 3, where 14 is the feeder, 15 the insulation and 16 the armor, also lies on the ground, and the operative or current-carrying portion of the armor will also vary in length as described above with reference to Fig. 1.

In the form shown in Fig. 2 the machine 1 carries a second drum 17 on which the anchor-rope 18 is wound. As explained above, this rope may be used as an auxiliary means for moving the machine when the work is exceptionally heavy. The rope is suitably anchored at 19. According to my invention this anchor rope may be used as a supplementary return feeder, in which event the end on the drum 17 will be connected to one terminal of the motor, and the end 19 to the rails 8. If desired, the rope 18 may, of course, be anchored at both ends of the field in a similar manner to the conductor 7 in Fig. 1, and the drum 17 be of such a form that the anchor-rope may be used to pull the machine in either direction.

In the so-called two-machine system it has heretofore been proposed to employ the anchor-rope as the grounded current-carrying conductor. In this system, however, the operative machine or implement is not directly connected to the motor, and consequently the plow-driver and machinist can either not understand one another at all, or do so only with difficulty. In addition, the two-machine system differs from the arrangement according to my invention in that the entire length of the bare return conductor in the two-machine system is traversed by the current, when the plow returns, whereas in the case of the direct-driven motor machine only that portion of the current-carrying conductor remains connected in circuit which corresponds to the course already worked. For preserving the feeder, the cable-drum is preferably provided with a regulatable and reversible independent drive, so that the cable can be wound up independently not only of the size of the machine-wagon and of the slip of the machine, but also of the winding diameter of the drum.

It is immaterial whether the motor winch be directly incorporated in the operative machine or implement or be detachably connected with the same, e. g. by means of a flexible shaft or similar auxiliary means. Also, the motor can simultaneously tow and can operate other tools on the machine. Further, any desired kind of current or system of connections may be employed for driving the electric motor.

I claim:—

1. In apparatus of the character described, the combination with an agricultural machine, of a fixed supply main, an electric motor on the machine, an insulated cable electrically connected to the main and to the motor, a drum on the machine for winding up and paying out said cable, and a bare, grounded, return conductor electrically connected to the motor, the unwound portion of said cable and said return conductor lying on the ground, the operative length of the return conductor being always substantially equal to that of the cable.

2. In apparatus of the character described, the combination with an agricultural machine, of a fixed supply main, an electric motor on the machine, an armored cable electrically connected to the main and to the motor, a drum on the machine for winding up and paying out said cable, the armor of said cable constituting a bare, grounded, return conductor electrically connected to the motor, the unwound portion of said cable lying on the ground, the operating current passing through the armor of only the outpayed part of said cable.

3. In apparatus of the character described, the combination with an agricultural machine, of a fixed supply main and a fixed, grounded return main, an electric motor on the machine, an insulated cable electrically connected to the supply main and to the motor, a drum on the machine for winding up and paying out said cable, and a bare, grounded return conductor electrically connected to the return main and to the motor, the unwound portion of said cable and said return conductor lying on the ground.

4. In apparatus of the character described, the combination with an agricultural machine, of a fixed supply main and a fixed, grounded return main, an electric motor on the machine, an insulated cable electrically connected to the supply main and to the motor, an anchor-rope constituting a bare, grounded return conductor electrically connected to the return main and to the motor, and a drum driven by the motor for winding up the anchor-rope, the unwound portion of said cable and said anchor-rope lying on the ground.

In testimony whereof I have signed my name to this specification in the presence of two witnesses.

WILHELM WORTMANN.

Witnesses:
JEAN GRUND,
CARL GRUND.

Copies of this patent may be obtained for five cents each, by addressing the "Commissioner of Patents, Washington, D. C."